(12) United States Patent
Burkhalter et al.

(10) Patent No.: US 9,134,069 B2
(45) Date of Patent: Sep. 15, 2015

(54) DEVICE FOR TRANSMITTING A TORQUE TO A ROTARY KILN

(75) Inventors: René Burkhalter, Rombach (CH);
Laurent Chichery, Cambrai-Cedex (FR)

(73) Assignees: Holcim Technology Ltd.,
Rapperswil-Jona (CH); CMD Engrenages et Reducteurs,
Cambrai-Cedex (FR)

( * ) Notice: Subject to any disclaimer, the term of this patent is extended or adjusted under 35 U.S.C. 154(b) by 545 days.

(21) Appl. No.: 12/998,806

(22) PCT Filed: Dec. 9, 2009

(86) PCT No.: PCT/IB2009/007699
§ 371 (c)(1),
(2), (4) Date: Jun. 3, 2011

(87) PCT Pub. No.: WO2010/067183
PCT Pub. Date: Jun. 17, 2010

(65) Prior Publication Data
US 2011/0232401 A1  Sep. 29, 2011

(30) Foreign Application Priority Data
Dec. 9, 2008 (AT) ................................ A 1913/2008

(51) Int. Cl.
*F16H 35/06* (2006.01)
*F27B 7/26* (2006.01)
*F16H 1/20* (2006.01)

(52) U.S. Cl.
CPC ... *F27B 7/26* (2013.01); *F16H 1/20* (2013.01);
*Y10T 74/1956* (2015.01); *Y10T 74/19642* (2015.01)

(58) Field of Classification Search
CPC ..... F16H 27/00; F16H 29/00; F16H 2001/00;
F16H 3/00; F16H 1/04; F27B 7/26; Y10T 428/25; Y10T 428/24372; Y10T 428/252
USPC .......... 74/395, 396, 411, 421 A, 421 R, 640; 248/676, 638; 432/103
See application file for complete search history.

(56) References Cited

U.S. PATENT DOCUMENTS

| | | | | |
|---|---|---|---|---|
| 1,966,246 A | * | 7/1934 | Jackson | .......................... 74/411 |
| 2,399,122 A | * | 4/1946 | Johnson | .......................... 74/446 |
| 2,441,901 A | * | 5/1948 | Petersen | .................... 74/421 R |
| 2,910,286 A | * | 10/1959 | Holm | ............................ 432/119 |
| 3,176,533 A | * | 4/1965 | Durand | ....................... 74/421 R |
| 3,669,433 A | * | 6/1972 | Hurst | ............................ 366/233 |

(Continued)

FOREIGN PATENT DOCUMENTS

| | | |
|---|---|---|
| CH | 140230 | 5/1930 |
| CN | 2086403 U | 10/1991 |

(Continued)

*Primary Examiner* — William Kelleher
*Assistant Examiner* — Zakaria Elahmadi
(74) *Attorney, Agent, or Firm* — Taft Stettinius & Hollister LLP

(57) ABSTRACT

In a device for transmitting a torque to a rotary kiln (13), including a drive shaft driven by a motor and having a drive pinion driving a gear rim connected to the rotary kiln, the drive pinion (5) drives the gear rim (12) via an interposed transmission (6), wherein a gear wheel (7) of the transmission (6) engages with the drive pinion (5) in a manner displaceable in the axial direction.

12 Claims, 4 Drawing Sheets

(56) References Cited

U.S. PATENT DOCUMENTS

| | | | | |
|---|---|---|---|---|
| 4,206,836 | A | * | 6/1980 | Wurr et al. .................... 192/223 |
| 4,315,439 | A | * | 2/1982 | Grachtrup ...................... 74/661 |
| 4,354,799 | A | * | 10/1982 | Hurst ........................... 414/756 |
| 4,554,842 | A | * | 11/1985 | Wood, III ....................... 74/409 |
| 4,674,348 | A | * | 6/1987 | Roberts ......................... 74/411 |
| 5,415,541 | A | * | 5/1995 | Kastingschafer et al. .... 432/103 |
| 5,733,115 | A | * | 3/1998 | Petersen ....................... 432/103 |
| 5,901,838 | A | * | 5/1999 | Nakatani et al. ............... 200/400 |
| 5,980,244 | A | * | 11/1999 | Bonin ........................... 432/103 |
| 6,213,763 | B1 | * | 4/2001 | Slade et al. .................... 432/103 |

FOREIGN PATENT DOCUMENTS

| | | |
|---|---|---|
| DE | 1 810 750 U | 5/1960 |
| DE | 1 500 472 A | 9/1969 |
| DE | 76 33 066 U1 | 7/1981 |
| DE | 32 16 636 A1 | 11/1982 |
| DE | 90 13 226 U1 | 11/1990 |
| DE | 9013226 * | 11/1990 |
| DE | 43 13 306 A1 | 11/1993 |
| EP | 0 021 038 A1 | 1/1981 |
| EP | 0 570 696 A1 | 11/1993 |
| FR | 1 401 324 | 4/1965 |

* cited by examiner

DEVICE FOR TRANSMITTING A TORQUE TO A ROTARY KILN

The invention relates to a device for transmitting a torque to a rotary kiln, including a drive shaft driven by a motor and having a drive pinion driving a gear rim connected to the rotary kiln.

Devices for transmitting rotational movements to a gear rim can, for instance, be taken from DE 1450712 A. A number of drives have in fact been developed to rotationally drive rotary kilns, wherein relatively high torques have to be transmitted because of the large weights of the kilns while, at the same time, the thermal expansions etc. of the rotary kilns have to be taken into account. Due to the thermal expansion of the kiln, or changes in the position of the rotary kiln caused by migration or thermal deformations of the rotary kiln, and the wobbling motion of the gear rim of the rotary kiln resulting therefrom, movements of the gear rim connected to the rotary kiln in the axial direction may occur over far more than 100 mm. During such an axial displacement of the gear rim, the drive is yet to reliably remain in engagement, wherein, furthermore, the drive shaft itself must, of course, be relieved as much as possible in order to keep it free from bending forces. It is, therefore, known to accommodate and support in a bearing housing the drive pinion meshing with the gear rim. Although such constructions allow for the appropriate stabilization of the drive, the axial and optionally radial displacements occurring because of the movements of the rotary kiln must be taken up on the engagement with the pinion meshing with the gear rim, which may, for instance, result in damage because of the high forces to be transmitted there.

The present invention, therefore, aims to improve a device for transmitting a torque to a rotary kiln of the initially defined kind to the effect that the movements of the rotary kiln, and hence the gear rim, will be reliably compensated.

To solve this object, the configuration according to the invention is devised such that the drive pinion drives the gear rim via an interposed transmission, wherein a gear wheel of the transmission engages with the drive pinion in a manner displaceable in the axial direction. By the axial displacements of the gear rim occurring not on the engagement with the pinion meshing with the gear rim, but on the engagement of a gear wheel of the transmission arranged between the drive pinion and the gear rim with the drive pinion, the axially displaceable engage-ment can be dimensioned for substantially lower forces. This will, in particular, apply if the transmission is designed as a reduction gear, what is usually the case with the drive of a rotary kiln, since the respectively engaging teeth of the gear wheels have to transmit substantially lower forces on the input side than on the output side. In the configuration according to the invention, merely a suitable axial and optionally radial guidance of the transmission plus the gear rim has to be provided in order for the transmission to perform the positional changes of the gear rim, which are caused by the movements of the rotary kiln, in conjunction with the gear rim.

In order to ensure the safe engagement of the drive pinion with the gear wheel of the transmission even during mutual axial displacements, the configuration is preferably devised such that the width of the gear wheel of the transmission engaging with the drive pinion is smaller than the width of the drive pinion. In this respect, the transmission is preferably displaceable in the axial direction by about 160 mm.

In the configuration according to the invention, the transmission together with the gear rim connected to the rotary kiln is mounted so as to be adjustable in the axial direction, as already mentioned above. The appropriate support is preferably provided in that the transmission is supported on a stationary structure by the aid of a support rod. In doing so, the support rod preferably allows for an at least single-axle, preferably double-axle, shift of the transmission in order to be able to account for the positional changes caused by the movements of the rotary kiln particularly well.

An accordingly good guidance of the transmission will be ensured in that the support rod is each pivotally hinged to the trans-mission and to the stationary structure, the support rod advantageously comprising a double-axle hinge on the stationary structure and a single-axle hinge on the transmission side.

The pivot axes are preferably arranged in a manner that a pivot axis of the pivotable hinge connection of the support rod extends parallel with the axis of rotation of the rotary kiln, and that at least one pivot axis of the pivotable hinge connection of the support rod extends normal to the axis of rotation of the rotary kiln. The pivot axis extending parallel with the axis of the rotary kiln thus allows for a change of the distance of the transmission from the axis of the rotary kiln. The pivot axis extending normal to the axis of rotation of the rotary kiln allows for the guidance of the transmission in the axial direction.

With the described support, no forces will be introduced into the drive shaft, bearing in mind the trackability of the transmission with the gear rim and the axially displaceable engagement of the transmission with the drive pinion at a merely axial movement of the gear rim. If, however, also a radial move-ment component occurs, a suitable compensation will have to take place in the drive shaft, and in this respect the configuration is preferably devised such that at least one universal joint is arranged between the drive shaft and the drive motor. In a particularly preferred manner, the cardanic articulation of the drive shaft to the motor may also be provided by a homokinetic joint so as to ensure a smooth torque transmission even in the angled state.

In order to hold the transmission in permanent engagement with the gear rim, the device according to the invention is preferably further developed such that the transmission comprises guide means cooperating with the gear rim and/or the rotary kiln in a manner that the transmission follows the axial and optionally radial movements of the gear rim. The guide means are advantageously comprised of races arranged on the trans-mission, particularly on the shaft, and guided on the outer periphery of the gear rim. The rollers roll off the outer periphery of the gear rim while ensuring that the transmission is engaged with the gear rim. In order to safeguard the contact between the transmission and the gear rim at a return travel or stop of the rotary kiln, further rollers are provided on the inner periphery of the gear rim.

A thermally stressable arrangement of the gear rim on the rotary kiln can be realized in a manner known per se in that the gear rim is connected to the rotary kiln via plates tangentially supported on the periphery of the rotary kiln.

In the following, the invention will be explained in more detail by way of an exemplary embodiment schematically illustrated in the drawing. Therein, FIG. 1 depicts an elevational view of the driving device according to the invention;

Figure 1:
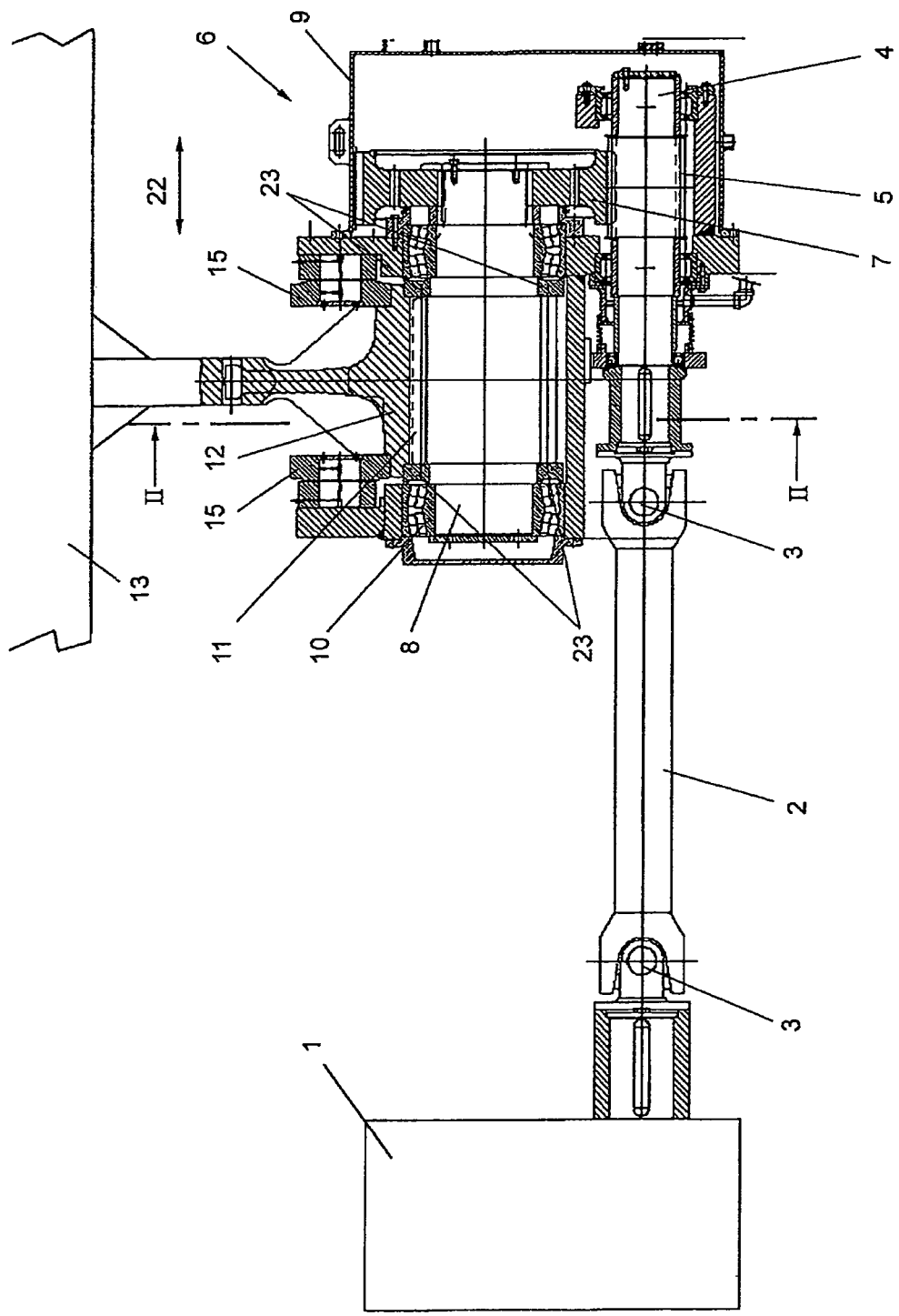

In FIG. 1, a motor 1 rotates a drive shaft 4 via an intermediate piece 2 articulately connected by cardanic joints 3. The drive shaft 4 is provided with a drive pinion 5 meshing with a gear wheel 7 of the transmission, particularly reduction gear 6. The gear wheel 7 drives a shaft 8 that is mounted in antifriction bearings within the housing 9 and provided with a pinion 11. The pinion 11 meshes with the gear rim 12, which is connected to the rotary kiln 13 via plates 14 tangentially supported on the periphery of the rotary kiln 13. The pinion 11 is held in engagement with the gear rim 12 by races 23 running on the outer side of the gear rim 12. Rollers 15 running on the inner periphery of the gear rim maintain the contact between the gear rim and the pinion at a return travel or stop of the rotary kiln.

Thermal expansions or contractions as well as regular axial movements of the rotary kiln may lead to displacements of the gear rim 12 in the sense of double arrow 22. The transmission 6, which is guided on the gear rim by the races 23, follows those displacement movements. The transmission, by its gear wheel 7, engages with the drive pinion 5 in a manner displaceable in the axial direction such that the drive of the rotary kiln will be ensured irrespectively of the axial displacement position of the gear rim 12. The fact that the width of the drive pinion 5 exceeds the width of the gear wheel 7 ensures engagement over the total displacement path.

Figure 2:
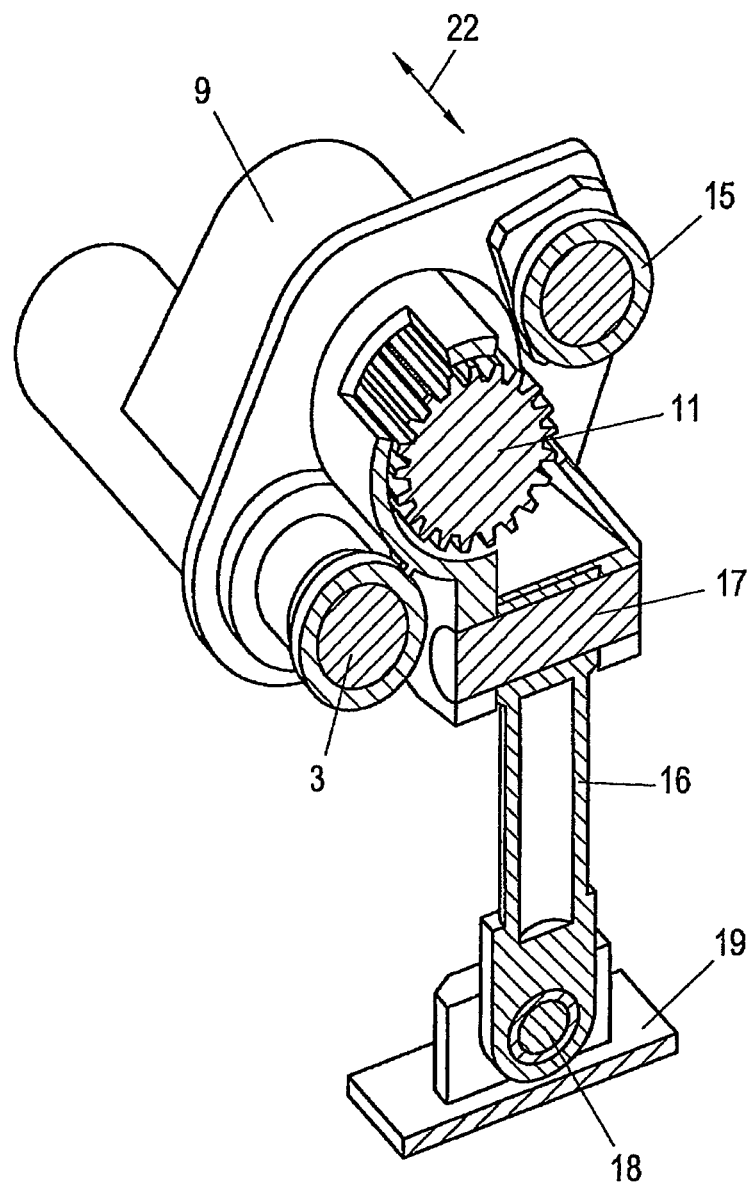
FIG. 2 is a perspective sectional view along line II-II of FIG. 1.

FIG. 2 illustrates a section along line II-II of FIG. 1 in a perspective view, from which the support rod 16 is apparent, which is concealed by the transmission 6 in FIG. 1. On the transmission side, the support rod 16 is mounted in a single-axle joint 17. On the sides of the base 19, the support rod 16 is mounted on the base 19 via a two-axle joint 18. The support-rod 16 carries the weight of the transmission 6, absorbing the force resulting from the drive torque. It allows the trans-mission to follow the gear rim 12 at thermal expansions or the like.

Figure 3:
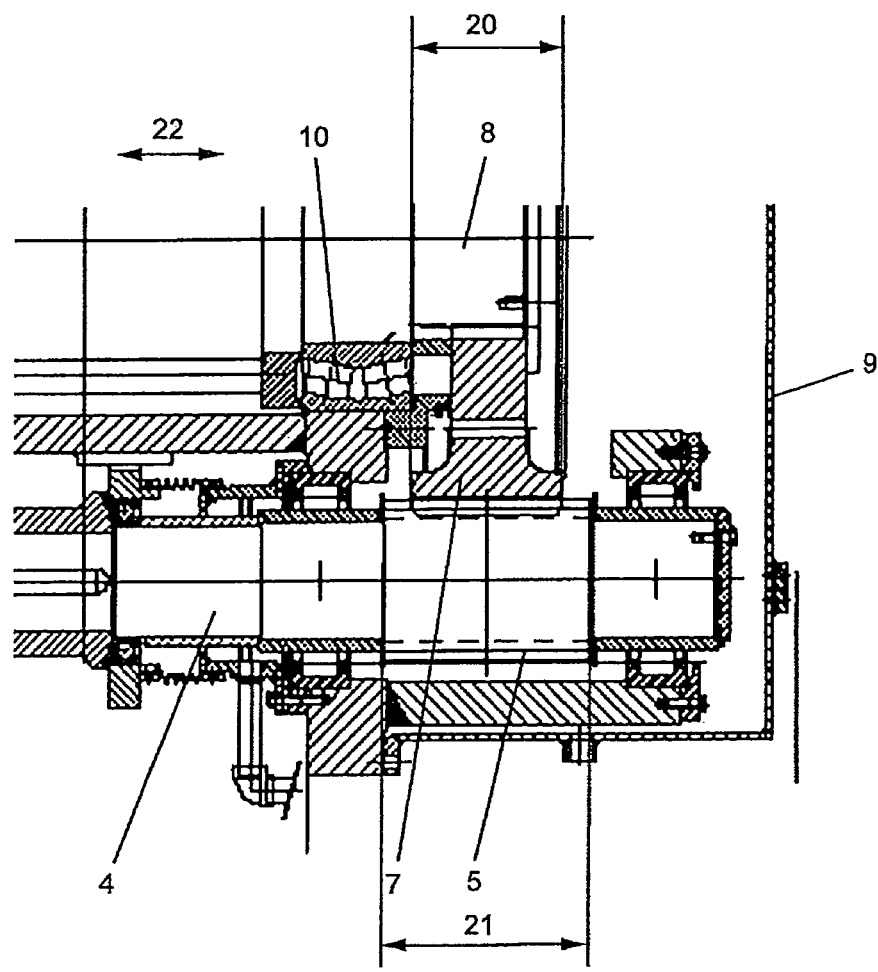
FIG. 3 depicts an enlarged illustration of the driving situation.

FIG. 3 depicts the region of engagement between the drive pinion 5 arranged on the drive shaft 4 and the gear wheel 7. The width of the gear wheel 7 is denoted by 20, and the width of the drive pinion 5 is denoted by 21. The extent of the axial displaceability in the sense of double arrow 22 is calculated from the difference of the widths 20 and 21, the play in either direction corresponding to one half of said difference.

Figure 4:
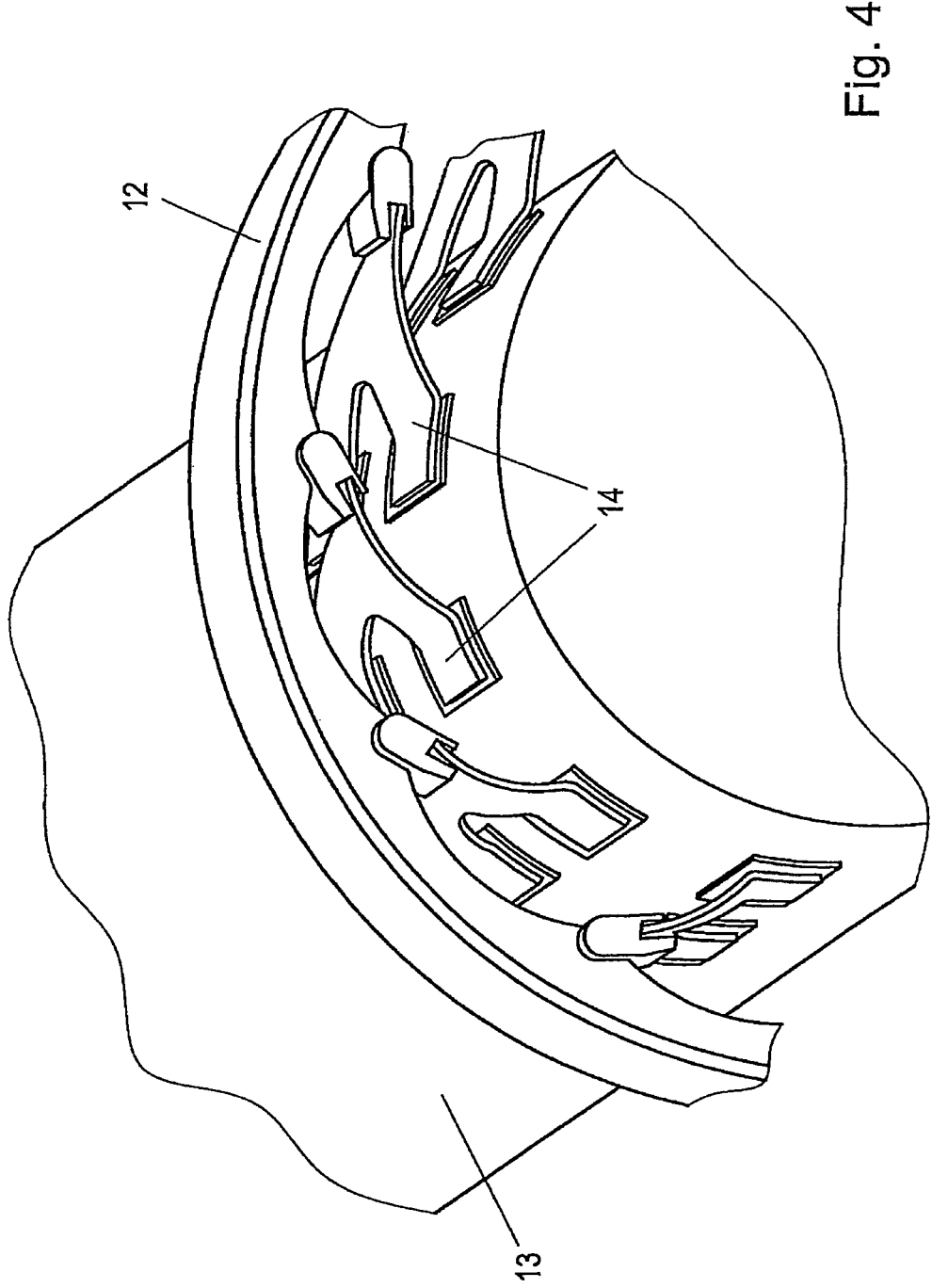
FIG. 4 is a detailed view of a gear rim fixed to a rotary kiln.

FIG. 4 illustrates the plates 14 that are tangentially supported on the periphery of the rotary kiln 13 and connect the rotary kiln 13 with the driven gear rim 12. By the resilient action of the plates 14, it is feasible to compensate for any thermal expansion of the rotary kiln in a simple manner. The length of the tangential plates is chosen so as to allow their attachment to different, rotary kiln dimensions within the field of application. The thickness and shape of the tangential plates are used as variables in a torsion analysis at a fixed diameter of the rotary kiln and changed in such a manner as to prevent the excitation of natural frequencies by any of the drive parts in the operating speed range.

The invention claimed is:

1. A device for transmitting a torque to a rotary kiln 13, comprising:
   a drive shaft 4 driven by a motor 1 and comprising a drive pinion 5 on the drive shaft 4; and
   a transmission 6 interposed between the rotary kiln 13 and the drive shaft 4, said interposed transmission 6 comprising a shaft 8 of the transmission, said transmission shaft 8 comprising a gear wheel 7 of the transmission 6, and said interposed transmission 6 further comprising a pinion 11 of the transmission 6 that meshes with a gear rim 12 connected to the rotary kiln 13,
   wherein
   the motor 1 rotates the drive shaft 4;
   the drive pinion 5 on the drive shaft 4 engages and meshes with the transmission gear wheel 7;
   the transmission gear wheel 7 drives the transmission shaft 8;
   the transmission pinion 11 meshes with the gear rim 12;
   the transmission gear wheel 7 engages with the drive pinion 5 in a manner displaceable in an axial direction 22;
   the transmission 6 comprises guide means cooperating with the gear rim 12 and/or the rotary kiln 13 in a manner that the transmission 6 follows axial movements of the gear rim 12; and
   the transmission 6 comprises guide means cooperating with the gear rim 12 and/or the rotary kiln 13 in a manner that the transmission 6 also follows radial movements of the gear rim 12.

2. A device according to claim 1, wherein a width 20 of the transmission gear wheel 7 engaging with the drive pinion 5 is smaller than a width 21 of the drive pinion 5.

3. A device according to claim 1, wherein the transmission 6 is supported on a stationary structure 19 by the aid of a support rod 16.

4. A device according to claim 3, wherein the support rod 16 allows for an at least single-axle shift of the transmission 6.

5. A device according to claim 3, wherein the support rod 16 is pivotally hinged to the transmission 6 and to the stationary structure 19.

6. A device according to claim 5, wherein a pivot axis of a pivotable hinge connection of the support rod 16 extends parallel with an axis of rotation of the rotary kiln 13.

7. A device according to claim 5, wherein at least one pivot axis of a pivotable hinge connection of the support rod 16 extends normal to an axis of rotation of the rotary kiln 13.

8. A device according to claim 4, wherein the support rod 16 comprises a double-axle hinge 18 on the stationary structure 19, and a single-axle hinge 17 on a transmission side of the support rod 16.

9. A device according to claim 1, wherein at least one universal joint 3 is arranged between the drive shaft 4 and the motor 1.

10. A device according to claim 1, wherein the guide means are comprised of races 23 arranged on the transmission shaft 8, and guided on an outer periphery of the gear rim 12.

11. A device according to claim 1, wherein the gear rim 12 is connected to the rotary kiln 13 via plates 14 tangentially supported on a periphery of the rotary kiln 13.

12. A device according to claim 1, wherein the transmission gear wheel 7 is displaceable with respect to the drive pinion 5 in the axial direction 22 by about 160 mm.

\* \* \* \* \*